United States Patent
Li et al.

(10) Patent No.: US 12,548,569 B2
(45) Date of Patent: Feb. 10, 2026

(54) METHOD AND SYSTEM OF DETECTING AND IMPROVING REAL-TIME MISPRONUNCIATION OF WORDS

(71) Applicant: Microsoft Technology Licensing, LLC, Redmond, WA (US)

(72) Inventors: Runnan Li, Beijing (CN); Sheng Zhao, Beijing (CN); Amit Srivastava, San Jose, CA (US); Huakai (Angelo) Liao, Vancouver (CA); Ana Parra, San Jose, CA (US); Tapan Bohra, San Jose, CA (US); Akshay Mallipeddi, Cupertino, CA (US); Siliang Kang, Redwood City, CA (US); Lisha Ma, Beijing (CN); Yinhe Wei, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/415,675

(22) PCT Filed: May 28, 2021

(86) PCT No.: PCT/CN2021/096621
§ 371 (c)(1),
(2) Date: Dec. 1, 2022

(87) PCT Pub. No.: WO2022/246782
PCT Pub. Date: Dec. 1, 2022

(65) Prior Publication Data
US 2024/0013790 A1    Jan. 11, 2024

(51) Int. Cl.
*G10L 25/60*    (2013.01)
*G09B 19/04*    (2006.01)
(Continued)

(52) U.S. Cl.
CPC ............ *G10L 15/222* (2013.01); *G10L 15/02* (2013.01); *G10L 2015/025* (2013.01); *G10L 2015/221* (2013.01)

(58) Field of Classification Search
CPC . G10L 15/222; G10L 15/02; G10L 2015/025; G10L 2015/221; G10L 25/60; G10L 25/72; G09B 19/04; G09B 19/06
See application file for complete search history.

(56) References Cited

U.S. PATENT DOCUMENTS 6,411,932 B1 *   6/2002   Molnar ................... G10L 13/00
                                                    704/254
7,778,831 B2     8/2010   Chen
(Continued)

FOREIGN PATENT DOCUMENTS

CN     101551947 A    10/2009
CN     107945788 A     4/2018
(Continued)

OTHER PUBLICATIONS

Final Office Action mailed on Mar. 25, 2024, in U.S. Appl. No. 17/410, 136, 22 pages.
(Continued)

*Primary Examiner* — Pierre Louis Desir
*Assistant Examiner* — Kristen Michelle Masters
(74) *Attorney, Agent, or Firm* — NovoTechIP International PLLC

(57) ABSTRACT

A method and system for enhancing pronunciation during a speech, the method including receiving audio data, the audio data including a speech, performing at least one of acoustic scoring and language scoring on the speech, determining a pronunciation score of one or more words of the speech based on the acoustic scoring and the language scoring, determining that the pronunciation score for the word does
(Continued)

not satisfy a threshold score, responsive to determining that the pronunciation score does satisfy the threshold score, identifying the word as mispronounced, and responsive to identifying the word as mispronounced, outputting the word and the pronunciation score thereof.

20 Claims, 9 Drawing Sheets

(51) Int. Cl.
    *G09B 19/06*     (2006.01)
    *G10L 15/02*     (2006.01)
    *G10L 15/22*     (2006.01)
    *G10L 25/72*     (2013.01)

(56) References Cited

U.S. PATENT DOCUMENTS

| | | | |
|---|---|---|---|
| 8,050,922 | B2 | 11/2011 | Chen |
| 8,457,967 | B2 | 6/2013 | Audhkhasi et al. |
| 9,747,897 | B2 | 8/2017 | Peng et al. |
| 9,792,908 | B1 | 10/2017 | Bassemir et al. |
| 10,069,971 | B1 | 9/2018 | Shaw et al. |
| 10,560,492 | B1 | 2/2020 | Ledet |
| 2002/0120447 | A1* | 8/2002 | Charleworth ......... G10L 15/06 704/254 |
| 2009/0089062 | A1 | 4/2009 | Lu |
| 2012/0322035 | A1 | 12/2012 | Julia |
| 2013/0231930 | A1 | 9/2013 | Sanso |
| 2014/0356822 | A1 | 12/2014 | Hoque et al. |
| 2015/0310852 | A1 | 10/2015 | Spizzo et al. |
| 2016/0049094 | A1 | 2/2016 | Gupta et al. |
| 2016/0077719 | A1 | 3/2016 | Threewits |
| 2016/0133155 | A1* | 5/2016 | Lee ......................... G09B 19/06 434/157 |
| 2016/0253999 | A1 | 9/2016 | Kang et al. |
| 2018/0075145 | A1 | 3/2018 | Zhao |
| 2018/0315420 | A1 | 11/2018 | Ash et al. |
| 2019/0361842 | A1 | 11/2019 | Wood et al. |
| 2019/0385480 | A1* | 12/2019 | Suzuki ...................... G06N 3/08 |
| 2020/0135050 | A1 | 4/2020 | Monge Nunez |
| 2020/0184958 | A1* | 6/2020 | Norouzi ................ G09B 19/04 |
| 2020/0296457 | A1 | 9/2020 | Church et al. |
| 2021/0065582 | A1 | 3/2021 | Liao et al. |
| 2021/0099317 | A1 | 4/2021 | Hilleli et al. |
| 2021/0103635 | A1 | 4/2021 | Liao et al. |
| 2021/0103851 | A1 | 4/2021 | Spotanski et al. |
| 2021/0118426 | A1 | 4/2021 | Li et al. |
| 2021/0151036 | A1 | 5/2021 | Diment |
| 2021/0312399 | A1 | 10/2021 | Asokan |
| 2021/0319786 | A1* | 10/2021 | Kain ...................... G09B 19/04 |
| 2022/0223066 | A1* | 7/2022 | Chen ....................... G10L 15/16 |
| 2022/0230082 | A1 | 7/2022 | Poddar |
| 2023/0061210 | A1 | 3/2023 | Gordan et al. |

FOREIGN PATENT DOCUMENTS

| | | |
|---|---|---|
| CN | 111081229 A | 4/2020 |
| EP | 0953970 A2 | 11/1999 |
| JP | 2016191739 A | 11/2016 |
| KR | 101672484 B1 | 11/2016 |

OTHER PUBLICATIONS

"Non Final Office Action Issued in U.S. Appl. No. 17/410,136", Mailed Date: Oct. 27, 2023, 21 Pages.

"International Search Report and Written Opinion Issued in PCT Application No. PCT/US22/037092", Mailed Date: Nov. 11, 2022, 9 Pages.

Applicant Initiated Interview Summary Issued in U.S. Appl. No. 16/560,783, Mailed Date : Jul. 26, 2022 3 Pages.

Audhkhasi, et al., "Formant-Based Technique for Automatic Filled-Pause Detection in Spontaneous Spoken English", In Proceedings of IEEE International Conference on Acoustics, Speech and Signal Processing, Apr. 19, 2009, 4 Pages.

Communication under Rule 70(2) and 70a(2) Received for European Application No. 21942358.9, mailed on Feb. 11, 2025, 01 pages.

Final Office Action Issued in U.S. Appl. No. 16/560,783, Mailed Date: Sep. 30, 2022 20 Pages.

Final Office Action Issued in U.S. Appl. No. 16/593,724, Mailed Date : Oct. 21, 2021 9 Pages.

Kaushik, et al., "Laughter and filler detection in naturalistic audio," In Journal of International Speech and Communication Association, 2015, pp. 2509-2513.

Kurihara, et al., "Presentation sensei: a presentation training system using speech and image processing," In Proceedings of the 9th international conference on Multimodal interfaces, 2007, November, pp. 358-365.

Non Final Office Action Issued in U.S. Appl. No. 16/560,783, Mailed Date: Feb. 17, 2023 24 Pages.

Non Final Office Action Issued in U.S. Appl. No. 16/560,783, Mailed Date: May 5, 2022 22 Pages.

Non Final Office Action Issued in U.S. Appl. No. 16/593,724, Mailed Date: Feb. 3, 2021 23 Pages.

Shangavi, et al., "Self-Speech Evaluation with Speech Recognition and Gesture Analysis," 2018 National Information Technology Conference (NITC), 2018, pp. 1-7 (Year: 2018).

Non-Final Office Action mailed on Aug. 13, 2024, in U.S. Appl. No. 17/410,136, 20 pages.

U.S. Appl. No. 17/410,136, filed Aug. 24, 2021.

"International Search Report and Written Opinion Issued in PCT Application No. PCT/CN21/096621", Mailed Date: Feb. 28, 2022, 10 Pages.

"GPT-3", Retrieved from: https://en.wikipedia.org/wiki/GPT-3, Jun. 28, 2021, 6 pages.

"(How to) Pronounce", Retrieved from: https://web.archive.org/web/20200320093418if_/https://apps.apple.com/us/app/ how-to-pronounce/id717945069, Mar. 20, 2020, 3 Pages.

"ELSA: Learn And Speak English", Retrieved from: https://apps.apple.com/US/app/elsa-learn-english-speech/id1083804886, Retrieved Date: Apr. 18, 2020, 3 Pages.

"English Pronunciation IPA", Retrieved from: https://web.archive.org/web/20200804151703if_/https://apps.apple.com/us/app/english-pronunciation-ipa/id939357791, Aug. 4, 2020, 3 Pages.

"Look Up: Pronunciation Checker & Dictionary", Retrieved from: https://web.archive.org/web/20191026074923/https://apps.apple.com/us/app/look-up-pronunciation-checker-dictionary/id1217022803, Oct. 26, 2019, 3 Pages.

"Say It: English Pronunciation", Retrieved from: https://web.archive.org/web/20190828012815if_/https://apps.apple.com/us/app/say-it-english-pronunciation/id919978521, Aug. 28, 2019, 3 Pages.

Pearce, James, "English Vocabulary: How to Speak with Fluency Like a Native", Retrieved from: https://web.archive.org/web/20210501023209/https://www.fluentu.com/blog/english/, May 1, 2021, 6 Pages.

Notice of Allowance mailed on Jan. 23, 2025, in U.S. Appl. No. 17/410,136, 11 pages.

Extended European Search Report Received in European Patent Application No. 21942358.9, mailed on Jan. 22, 2025, 09 pages.

Notice of Allowance mailed on Mar. 19, 2025, in U.S. Appl. No. 17/410,136, 8 pages.

\* cited by examiner

Mayonnaise

- Mayonnaise is high in fat and
- 1tbsp packs 90 calories and 1 the latter of which is 15.4% of recommended intake
- It's easy for calories and fat to up when you're not paying att portion sizes
- Canola and olive oil mayonna available as "healthier" option Pronunciation
mayonnaise
mei-uh-neiz 🔊 1X xxxxxxx
mei-ow-neiz 🎙
✓ Good job! Perfect pronunciation 🎙 Practice

FIG. 4C

METHOD AND SYSTEM OF DETECTING AND IMPROVING REAL-TIME MISPRONUNCIATION OF WORDS

TECHNICAL FIELD

Various implementations relate to detection and/or correction of mispronounced words. Specifically, implementations relate to detecting mispronunciation and providing feedback on the correct pronunciation of words when a speaker mispronounces the words.

BACKGROUND

Mispronounced words during a presentation may create confusion in an audience, and may compromise the message or teaching being provided. For example, during a conference, audience members may miss an important point that the presenter is trying to make because of one or more mispronounced words. As another example, many applications such as making a phone call, asking for directions from a car GPS, or ordering services currently rely on spoken instructions. Mispronouncing instructions while using these application may lead to mistakes and unnecessary delays. In addition, as the use of speech-to-text applications is rapidly expanding, mispronouncing words may lead to unnecessary review and correction of the written transcripts, thus causing the speaker to spend a larger amount of time than would have been necessary had they not mispronounced the words.

Hence, there is a need for improved systems and methods of detecting and/or correcting the mispronunciation of words.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving audio data, the audio data including a speech, performing at least one of acoustic scoring and language scoring on the speech, determining a pronunciation score of one or more words of the speech based on the acoustic scoring and the language scoring, determining that the pronunciation score for the one or more words does not satisfy a threshold score, responsive to determining that the pronunciation score does not satisfy the threshold score, identifying the one or more words as mispronounced, and responsive to identifying the one or more words as mispronounced, outputting the one or more words and the pronunciation score thereof.

In yet another general aspect, performing the acoustic scoring includes extracting phonemes from one or more words of the speech, and assigning a first score to each of the one or more words based on the extracted phonemes, the first score indicating a first level of confidence that a pronunciation of the one or more words is accurate.

In a further general aspect, performing the language scoring includes extracting the one or more words from the speech, and assigning a second score to each of the extracted words, the second score indicating a second level of confidence that the pronunciation of the extracted word is accurate.

In another example, determining the pronunciation score includes combining the first score and the second score.

In a further example, determining the pronunciation score of the one or more words includes using a decision tree such as, e.g., a gradient boosting tree.

In yet another example, the one or more words have a length greater than three letters, the one or more words are not functional words, and the one or more words are not divisive.

In another example, the pronunciation score is on a scale of 1 to 100, and the threshold is a score of 75.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Additional advantages and novel features of these various implementations will be set forth in part in the description that follows, and in part will become more apparent to those skilled in the art upon examination of the following or upon learning by practice of the invention.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A-4C illustrate example user interface screens of an application providing pronunciation assistance, according to various implementations.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Enunciating correctly by a speaker helps the speaker's audience understand and remain engaged throughout the speaker's presentation. In various implementations, users can practice their pronunciation of the words that they will be using during a presentation, thus building their confidence before, e.g., immediately before the actual presentation. This practice may also help language students to better practice a language such as, English, and to become better presenters in that language.

Various implementations identify words spoken by the presenter but that were mispronounced with respect to a standard pronunciation. For example, with respect to English in the United States, the spoken words are compared to Standard American English. While rehearsing, if a speaker mispronounces a word, the speaker may see a real-time feedback card identifying the mispronounced word and providing the capability to play the correct pronunciation of that word. At the end of the rehearsal session, the speaker can see the list of all the words they mispronounced during the entire session, and can practice them to improve their pronunciation.

Various implementations accurately identify words that are spoken and mispronounced, and provide the correct pronunciation of the mispronounced words.

Mispronouncing words during a presentation presents a technical problem because the message of the presentation may be lost to an audience. Mispronouncing instructions in a speech-recognition application such as, making a phone call using speech recognition, asking for directions from a car GPS, or ordering services using speech recognition, may also create issues of recognizing and acting on the wrong information. As a result, the wrong phone call may be made, the wrong order may be placed, or the wrong GPS coordinates may be provided.

To address this technical problem and more, in an example, this description provides a technical solution for detecting in real time when a speaker mispronounces words and/or providing the correct pronunciation of misspoken words to the speaker in real time.

Figure 1:
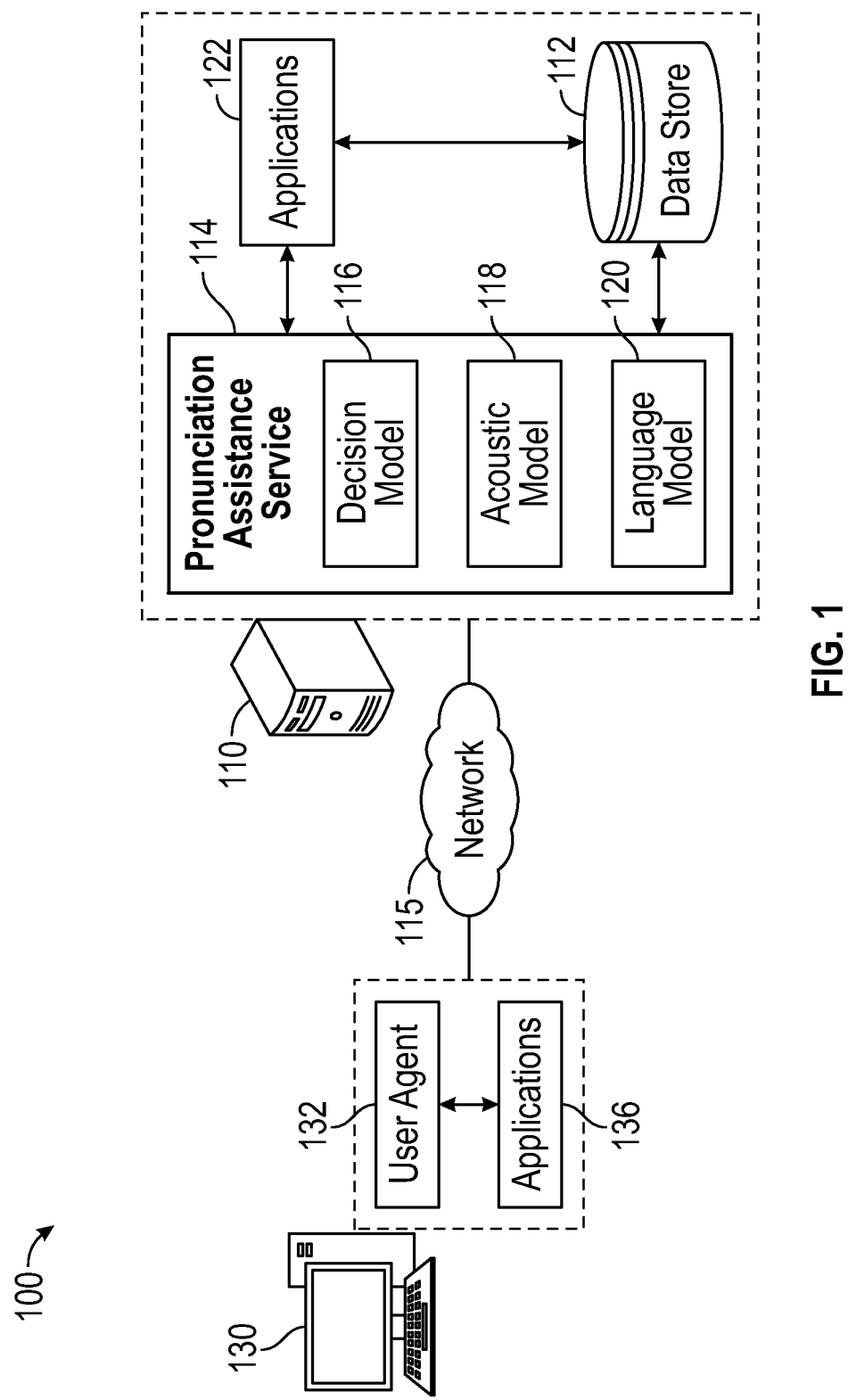
FIG. 1 depicts an example system upon which aspects of this disclosure may be implemented.

FIG. 1 illustrates an example system 100, upon which aspects of this disclosure may be implemented. The system 100 may include a server 110 which may be connected to or include a data store 112 which may function as a repository in which datasets relating to training models, data relating to the pronunciation assistance service and/or data relating to applications 122 may be stored. Although shown as a single data store, the data store 112 may be representative of multiple storage devices and data stores which may be connected to each of the pronunciation assistance service 114, applications 122 or models 118 and 120. Moreover, the server 110 may include a plurality of servers that work together to deliver the functions and services provided by each service or application. The server 110 may operate as a shared resource server located at an enterprise accessible by various computer client devices such as client device 130. The server may also operate as a cloud-based server for offering pronunciation assistance services in one or more applications such as applications 122.

The server 110 may include and/or execute a pronunciation assistance service 114 which may provide intelligent pronunciation feedback for users utilizing an application on their client devices such as client device 130. The pronunciation assistance service 114 may operate to examine data received from the user's client device 130 via an application (e.g., applications 122 or applications 136), examine the data and provide feedback to the user regarding their speech or presentation. In an example, the pronunciation assistance service 114 may utilize a decision model 116, an acoustic model 118, and a language model 120 to parse the user's speech and provide feedback regarding the user's pronunciation of one or more words used in the speech. Each of the models used as part of the pronunciation assistance service may be trained by a training mechanism such as mechanism known in the art. The training mechanism may use training datasets stored in the datastore 112 or at other locations to provide initial and ongoing training for each of the models 118 and 120. In one implementation, the training mechanism may use labeled training data from the datastore 112 (e.g., stored user input data) to train each of the models 118 and 120, via deep neural networks. The initial training may be performed in an offline stage.

For example, audio data may be taken from previous speeches such as, e.g., a conference, and words are extracted and individually labeled as being correctly or incorrectly pronounced, and using those labels to train the GBT model. GBT produces predictions based on various models such as decision trees. In implementations, GBT is trained using phoneme level features, word level features, speech related features like signal-to-noise ratio (SNR), confidence scores, and the like. In implementations, each datapoint may be labelled as correctly or incorrectly pronounced. For example, each word and the audio bits corresponding to each word may be extracted from previous speeches. These audio bits may be human labeled for being either correctly pronounced or mispronounced, and the result is a word, its corresponding audio bit and its label. The audio bits are sent for speech recognition to a speech engine which has the language model and the acoustic model. These features are the input to the GBT model and the label for the audio files are the output form the GBT model. Accordingly, the GBT model may be trained using previous speeches following this procedure.

To ensure compliance with privacy policies, the speaker may need to consent to their information being collected and stored to utilize this feature.

In various implementations, the acoustic model 118 may be used in automatic speech recognition to represent the relationship between an audio signal and the phonemes or other linguistic units that make up the speech. The acoustic model 118 may be learned from a set of audio recordings and their corresponding transcripts and may be created by taking audio recordings of speech, and their text transcriptions, and using software to create statistical representations of the sounds that make up each word such as the pitch, energy, phonemes, and the like. For example, audio can be encoded at different sampling rates (i.e. samples per second), the most common sampling rates being: 8 kHz, 16 kHz, 32 kHz, 44.1 kHz, 48 kHz, or 96 kHz, and different bits per sample, the most common bits per sample being 8-bits, 16-bits, 24-bits or 32-bits. Accordingly, the acoustic model 118 may work better when trained with speech audio recorded at the same sampling rate/bits per sample as the speech being recognized. Other models may also be used.

In various implementations, the language model 120 may be a probability distribution over sequences of words. Given such a sequence, say of length m, the language model 120 may assign a probability to the whole sequence. The language model provides context to distinguish between words and phrases that sound similar. For example, in American English, the phrases "recognize speech" and "wreck a nice beach" sound similar, but mean different things. The language model 120 may use contextual data (e.g., from the context of the speech) to correctly identify the words in the speech and distinguish between words that sound similar.

In various implementations, the decision model 116 may include a gradient boosting tree (GBT), which is a machine learning technique for regression and classification problems, that produces a prediction model in the form of an ensemble of weak prediction models, typically decision trees. GBT combines weak learners into a single strong learner in an iterative fashion. GBT may be summarized as sequentially combining weak learners in way that each new learner fits to the residuals from the previous step so that the model improves. The final model aggregates the results from each step and a strong learner is achieved. Gradient boosted decision tree algorithm may use decision trees as week learners. A loss function may be used to detect the residuals. For instance, mean squared error (MSE) can be used for a regression task and logarithmic loss (log loss) can be used for classification tasks. Existing trees in the model may not change when a new tree is added. The added decision tree fits the residuals from the current model.

The client device 130 may be connected to the server 110 via a network 115. The network 115 may be a wired or wireless network(s) or a combination of wired and wireless networks that connect one or more elements of the system 100. The client device 130 may be a personal or handheld computing device having or being connected to input/output elements that enable a user to interact with various applications (e.g., applications 122 or applications 136). Examples of suitable client devices 130 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 6 and 7.

The client device 130 may include one or more applications 136. Each application 136 may be a computer program executed on the client device that configures the device to be responsive to user input to allow a user to provide audio input in the form of spoken words via the application 136. Examples of suitable applications include, but are not limited to, a productivity application (e.g., job searching application that provides a job interview coach or a training application that trains employees such as customer service staff on responding to customers, etc.), presentation application (e.g., Microsoft PowerPoint), a document editing application, communications application or a standalone application designed specifically for providing pronunciation assistance.

In some examples, applications used to receive user audio input and provide feedback may be executed on the server 110 (e.g., applications 122) and be provided via an online service. In one implementation, web applications may communicate via the network 115 with a user agent 132, such as a browser, executing on the client device 130. The user agent 132 may provide a user interface that allows the user to interact with applications 122 and may enable applications 122 to provide user data to the pronunciation assistance service 114 for processing. In other examples, applications used to receive user audio input and provide feedback maybe local applications such as the applications 136 that are stored and executed on the client device 130 and provide a user interface that allows the user to interact with the applications. User data from applications 136 may also be provided via the network 115 to the pronunciation assistance service 114 for use in providing pronunciation feedback.

Figure 2:
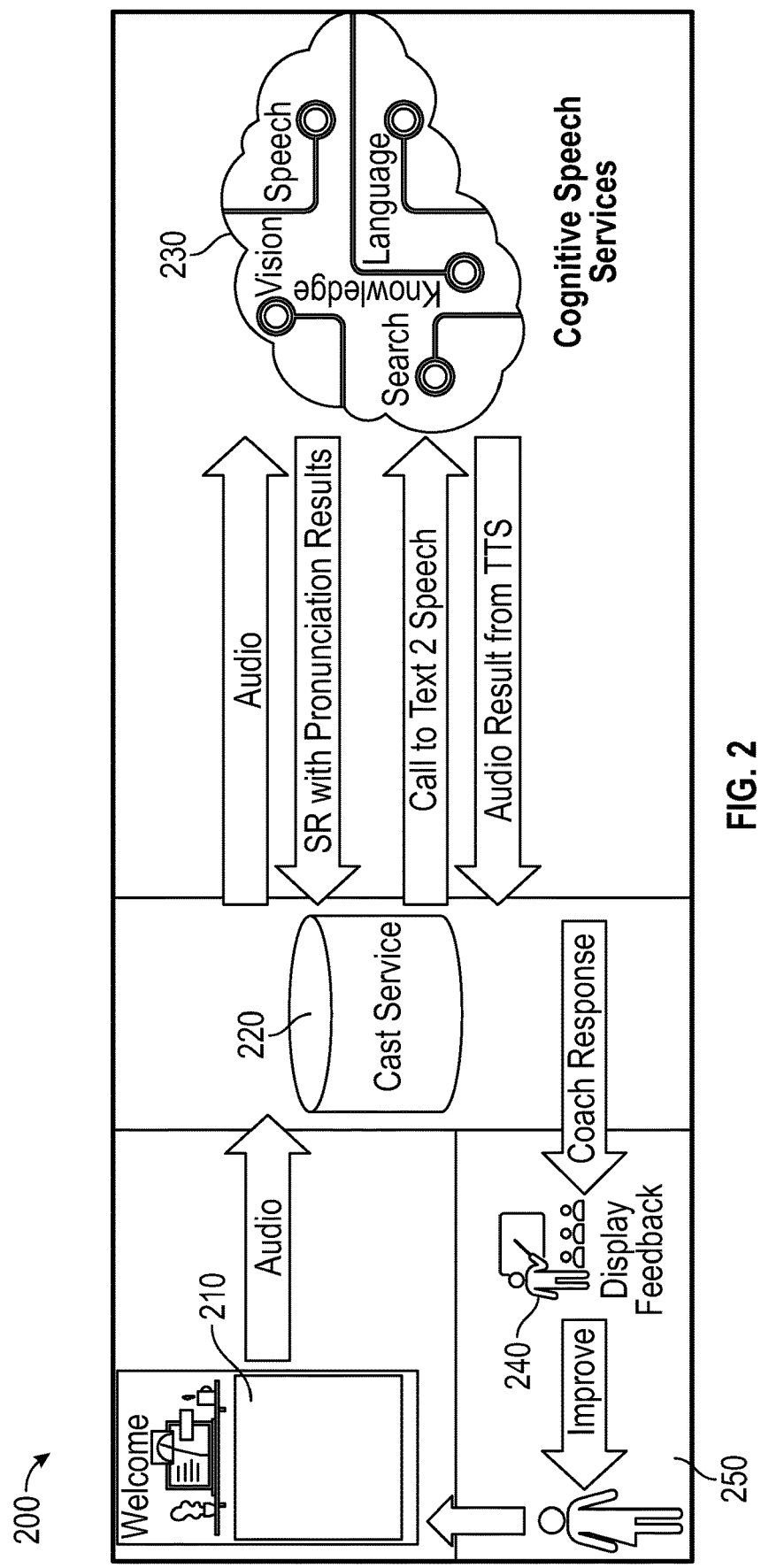
FIG. 2 depicts an example architecture for an application or service that provides mispronunciation detection and pronunciation assistance, according to various implementations.

FIG. 2 depicts an example architecture for an application or service that provides mispronunciation detection and pronunciation assistance, according to various example embodiments. In FIG. 2, an audio reception device 210 may receive a speech delivered by a speaker. To ensure compliance with privacy policies, the speaker may need to consent to their information being collected and stored to utilize this feature. The audio reception device 210 may forward the speech to the cast service 220. In some implementations, the cast service 220 may digitize the speech received from the audio reception device 210, and may forward the digitized speech to the cognitive speech services 230. With reference to FIG. 1, the cognitive speech services 230 may include the pronunciation assistance service 114. The cognitive speech services 230 may also use an acoustic model and a language model to parse the received speech into words and to score the various words based on their respective pronunciations. The cognitive speech services 230 may also utilize a decision tree to determine a final score of the pronunciation of the words in the speech based on the scores obtained via the acoustic model and the language model.

In some implementations, the cognitive speech services 230 may return the speech recognition (SR) results to the cast service 220, the SR results including pronunciation results. For example, pronunciation results may include the pronunciation scores of the words spoken during the speech. The cognitive speech services 230 may also deliver a transcribed text of the speech received from the cast service 220, and may deliver the correct pronunciation of the received text. For example, the correct pronunciation of various words is the pronunciation according to standard American English.

In some implementations, the cast service 220 may provide the correct pronunciation of various words, for example words that have a score below a given threshold, to the person delivering the speech as a feedback 240. For example, the feedback 240 may be an audio feedback, with the cast service 220 generating a sound corresponding to the correct pronunciation of the word, or a visual display of the correct pronunciation and the correct transcription of words with scores below the given threshold which may include the display of a syllable or phoneme sequence of the word to the speaker. The feedback 240 may then lead the person delivering the speech to improve their speech by, for example, repeating the mispronounced words according to the correct pronunciation feedback 240 delivered by the cast service 220 and generate a new pronunciation 250.

In some implementations, the new pronunciation 250 may in turn be received by the audio reception device 210, and the above cycle may be reiterated. After one or more cycles, the person delivering the speech may have a more correct pronunciation of the mispronounced words included in the delivered speech.

Figure 3A:
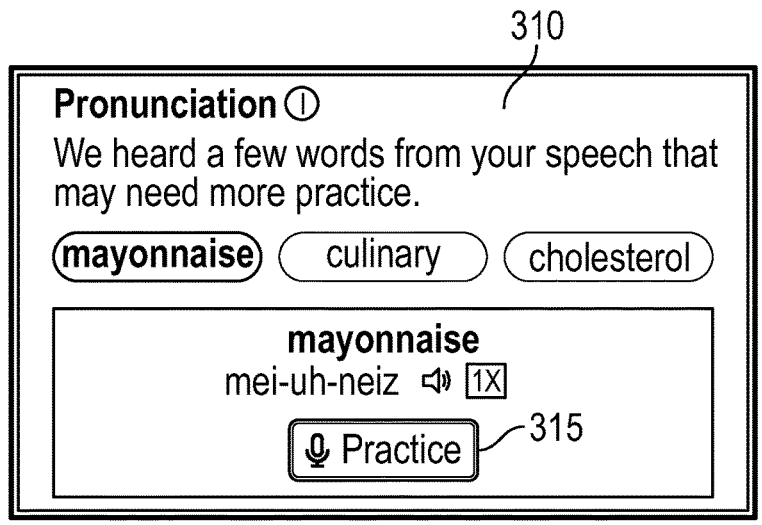
FIGS. 3A-3C illustrate example user interface screens of an application providing pronunciation assistance, according to various implementations.
Figure 3B:
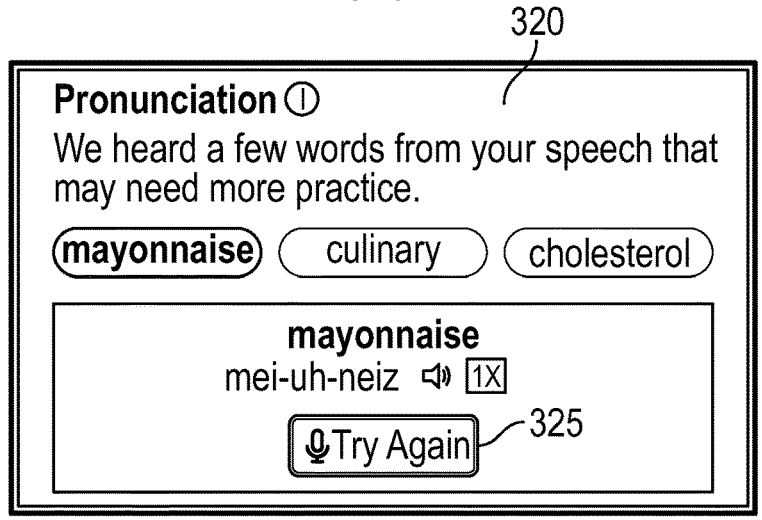
Figure 3C:
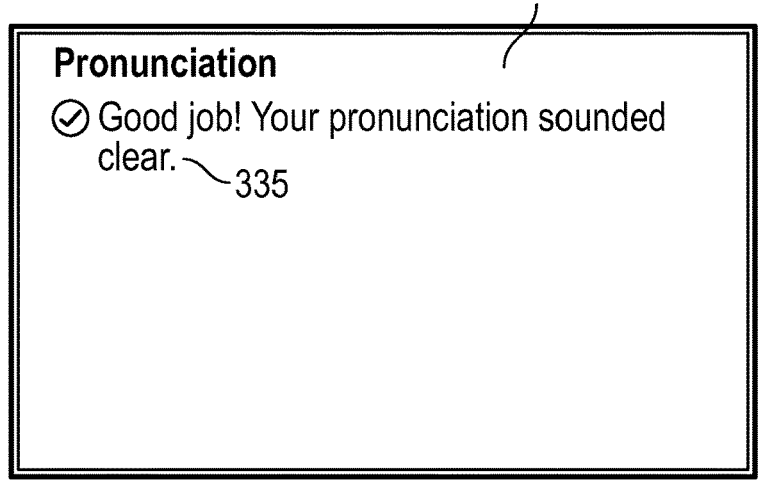

FIGS. 3A-3C illustrate example user interface screens of an application providing pronunciation assistance, according to various implementations. In FIG. 3A, the user interface 310 provides feedback to the speaker that a mispronounced word was detected. With reference to FIG. 2, the cognitive speech services 230 calculates pronunciation scores for the words and provides feedback 240 to the speaker. Specifically, the cognitive speech services 230 have calculated a score that is lower than a given threshold for at least one word in the speech. For example, the scores are given on a scale of 1 to 100, and the pronunciation of one word is scored at less than a threshold of 75, which indicates that the word has not been pronounced satisfactorily, or sufficiently close to standard American English. In the user interface 310, a plurality of words have been identified as having been mispronounced, namely "mayonnaise," "culinary" and "cholesterol." In the example illustrated in FIG. 3A, the user interface 310 first informs the speaker that the word "mayonnaise" has been mispronounced, and enables the speaker to practice pronouncing that word. Specifically, the user interface 315 prompts the speaker to pronounce the mispronounced word one more time. With reference to FIG. 2, a new pronunciation 250 is requested. Accordingly, the speaker practices pronouncing the previously mispronounced word, i.e., "mayonnaise," one more time.

FIG. 3B illustrates a user interface 320 that is displayed to the speaker after the speaker has practiced pronouncing the previously mispronounced word, i.e., "mayonnaise," one more time. In this case, the second pronunciation of the word "mayonnaise" remains unsatisfactory. With reference to FIG. 2, the cognitive speech services 230 has calculated a pronunciation score to the practice pronunciation that remains lower than the threshold, for example, lower than 75 on a scale of 1 to 100. As such, the feedback 240 illustrated in FIG. 2 provided to the speaker is illustrated by user interface 325 in FIG. 3B, and the speaker is informed that the pronunciation remains incorrect and is prompted to practice pronouncing the word once again.

FIG. 3C illustrates a user interface 330 that is displayed to the speaker after the speaker has practiced pronouncing the previously mispronounced word, i.e., "mayonnaise," yet one more time. In this case, the third pronunciation of the word "mayonnaise" is satisfactory. With reference to FIG. 2, the cognitive speech services 230 has calculated a pronunciation score to the practice pronunciation that is now equal to or higher than the threshold, for example, equal to or higher than 75 on a scale of 1 to 100. As such, the feedback 240 illustrated in FIG. 2 provided to the speaker is illustrated by user interface 335 in FIG. 3C, and the speaker is informed that the pronunciation is satisfactory. In various implementations, the user interface 310 may now emphasize the second mispronounced term, "culinary," and start the above cycle over by asking the speaker to practice pronouncing that word. In some implementations, the user interfaces 310, 320 and 330 may be or include pop-up menus that are displayed to the speaker during the speech or during speech practice. For example, the speaker may choose to not select any of the user interfaces 310, 320 and/or 330.

Figure 4A:
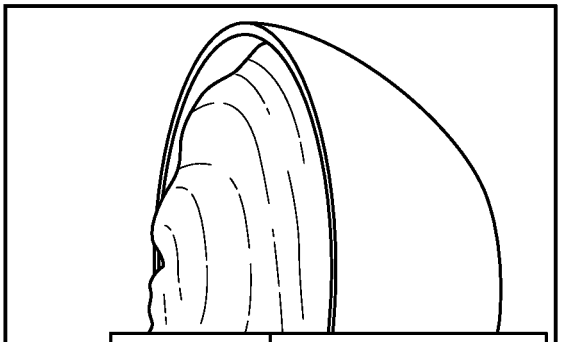
Figure 4B:
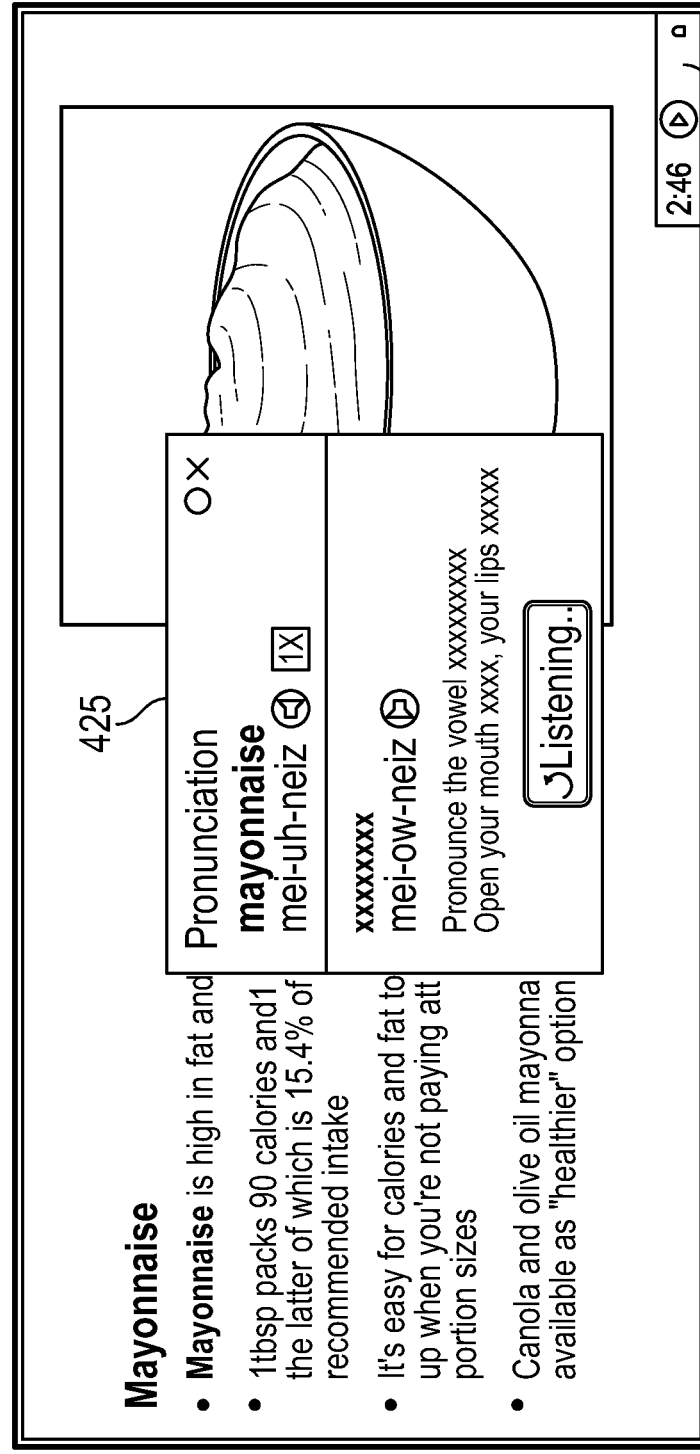

FIGS. 4A-4C illustrate example user interface screens of an application providing a pronunciation assistance, according to various implementations. In FIG. 4A, the user interface 410 provides feedback to the speaker that a mispronounced word was detected. With reference to FIG. 2, the cognitive speech services 230 calculate a pronunciation score for the words and provide feedback 240 to the speaker. Specifically, the cognitive speech services 230 have calculated a score for at least one word from the speech with a score that is lower than a given threshold. For example, the scores are given on a scale of 1 to 100, and the pronunciation of one word is scored at less than a threshold of 75, which indicates that the word has not been pronounced satisfactorily, or sufficiently close to standard American English. In the user interface 410, one word has been identified as having been mispronounced, namely "mayonnaise." In the example illustrated in FIG. 4A, the user interface 410 first informs the speaker that the word "mayonnaise" has been mispronounced, and asks the speaker to practice pronouncing that word one more time. Specifically, the user interface 415 prompts the speaker to pronounce the mispronounced word one more time via the button "Practice." The user interface 415 may also provide the ability for the speaker to listen to the correct pronunciation of the word, in this example, the correct pronunciation of the word "mayonnaise." With reference to FIG. 2, a new pronunciation 250 is requested. Accordingly, the speaker practices pronouncing the previously mispronounced word, i.e., "mayonnaise," one more time. In addition, the user interface 410 may include another interface 418 which provides the ability to resume rehearsal. For example, when feedback is provided to the speaker via, e.g., user interface 415, the speech or speech rehearsal is paused. When the feedback is done, rehearsal can resume via user interface 418. Accordingly, when the speaker selects the interface 418, the speaker may listen to the correct pronunciation of the word "mayonnaise." With reference to FIG. 2, the cognitive speech services 230 output the correct pronunciation to the speaker via feedback 240.

FIG. 4B illustrates a user interface 420 that is displayed to the speaker after the speaker has practiced pronouncing the previously mispronounced word, i.e., "mayonnaise," one more time. In this case, the user interface 425 indicates that the system is "listening" to the speaker's second pronunciation of the previously mispronounced word, i.e., "mayonnaise." Accordingly, the speaker may be given another opportunity to listen to the correct pronunciation of the word via another user interface 425 which, if selected by the speaker, outputs to the speaker the correct pronunciation of the word that was previously mispronounced, i.e., the word "mayonnaise." With reference to FIG. 2, the cognitive speech services 230 is receiving the audio signal from the audio reception device 210 via the cast service 220. The user interface 428 allows the speaker to resume the speech, or the speech rehearsal. When the feedback is done, rehearsal can resume via user interface 428. With reference to FIG. 2, the cognitive speech services 230 output the correct pronunciation to the speaker via feedback 240.

FIG. 4C illustrates a user interface 430 that is displayed to the speaker after the speaker has practiced pronouncing the previously mispronounced word, i.e., "mayonnaise." In this case, the second pronunciation of the word "mayonnaise" is satisfactory. With reference to FIG. 2, the cognitive speech services 230 has given a pronunciation score to the practice pronunciation that is equal to or higher than the threshold, for example, equal to or higher than 75 on a scale of 1 to 100. As such, the feedback 240 illustrated in FIG. 2 provided to the speaker is illustrated by user interface 435 in FIG. 4C, and the speaker is informed that the pronunciation is satisfactory. In addition, the speaker may be given another opportunity to listen to the correct pronunciation of the word by selecting user interface 435, e.g., for confirmation that the speaker's pronunciation is correct. When the feedback is received, the speaker may resume the speech rehearsal via user interface 438.

Figure 5:
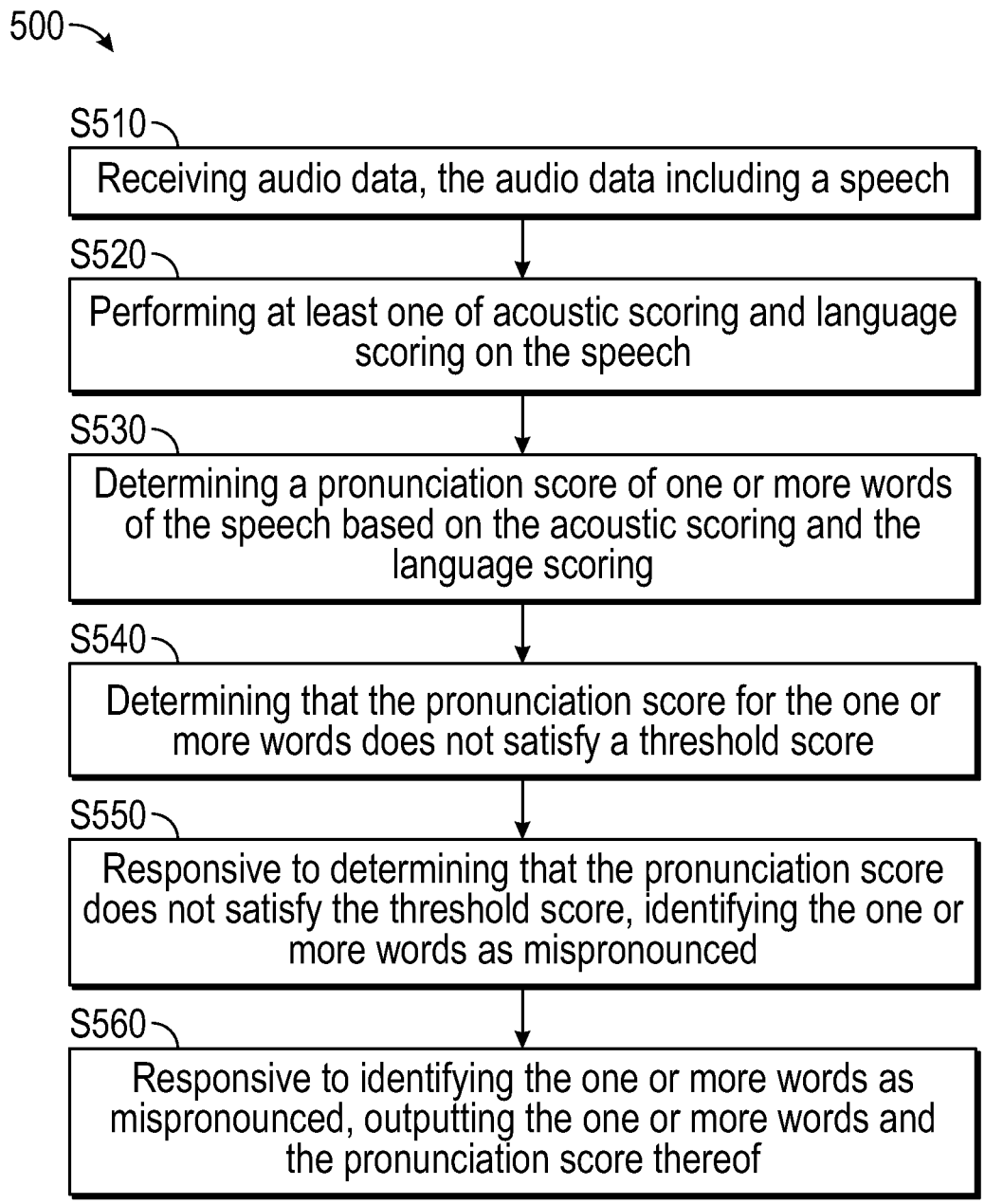
FIG. 5 is a flow diagram depicting a method for providing pronunciation assistance, according to various implementations.

FIG. 5 is a flow diagram depicting a method for providing pronunciation assistance, according to various implementations. In FIG. 5, the process 500 starts at S510, where audio data is received, the audio data including a speech. With respect to FIG. 2, the cast service 220 receives the audio data, such as a speech, from the audio device 210. The process 500 includes performing at least one, or both, of acoustic scoring and language scoring on the received speech at S520. With respect to FIG. 2, the cognitive speech services 230 perform acoustic scoring or language scoring on the speech received form the cast service 220. In order to perform acoustic scoring, the process 500 may include extracting phonemes from one or more words of the speech, and assigning a first score to each of the one or more words based on the extracted phonemes, the first score indicating a first level of confidence that a pronunciation of the one or more words is accurate. In order to perform language scoring, the process 500 may include extracting one or more words from the speech, and assigning a second score to each of the extracted words, the second score indicating a second level of confidence that the pronunciation of the extracted word is accurate.

In implementations, the one or more words that are extracted from the speech have a length that is greater than three letters. The one or more words may also not be functional words such as, e.g., would, could, will, and, or, has, and the like. The one or more words may also not have a divisive meaning such as, e.g., a discriminatory or criminal meaning. With reference to FIG. 2, the cognitive speech services 230 may perform both the acoustic scoring and the language scoring.

In various implementations, the process 500 includes determining a pronunciation score of one or more words of the speech based on the acoustic scoring and the language scoring at S530. With respect to FIG. 2, the cognitive speech services 230 make the determination of the pronunciation score. For example, the cognitive speech services 230 may determine the pronunciation score by combining the first score and the second score. For example, the pronunciation score may be a score on a scale of 1 to 100, 1 being extremely bad pronunciation, and 100 being perfect pronunciation according to standard American English. The cognitive speech services 230 may also determine the pronunciation score by using a decision tree such as, e.g., a gradient boosting tree (GBT).

In various implementations, the process 500 includes determining that the pronunciation score for the word does not satisfy a threshold score at S540, and responsive to determining that the pronunciation score for the word does not satisfy the threshold score, the process 500 includes identifying the word as mispronounced at S550. In various implementations, responsive to identifying the word as mispronounced, the process 500 includes outputting the word and the pronunciation score of the word at S560. For example, the threshold score may be a score of 75.

Figure 6:
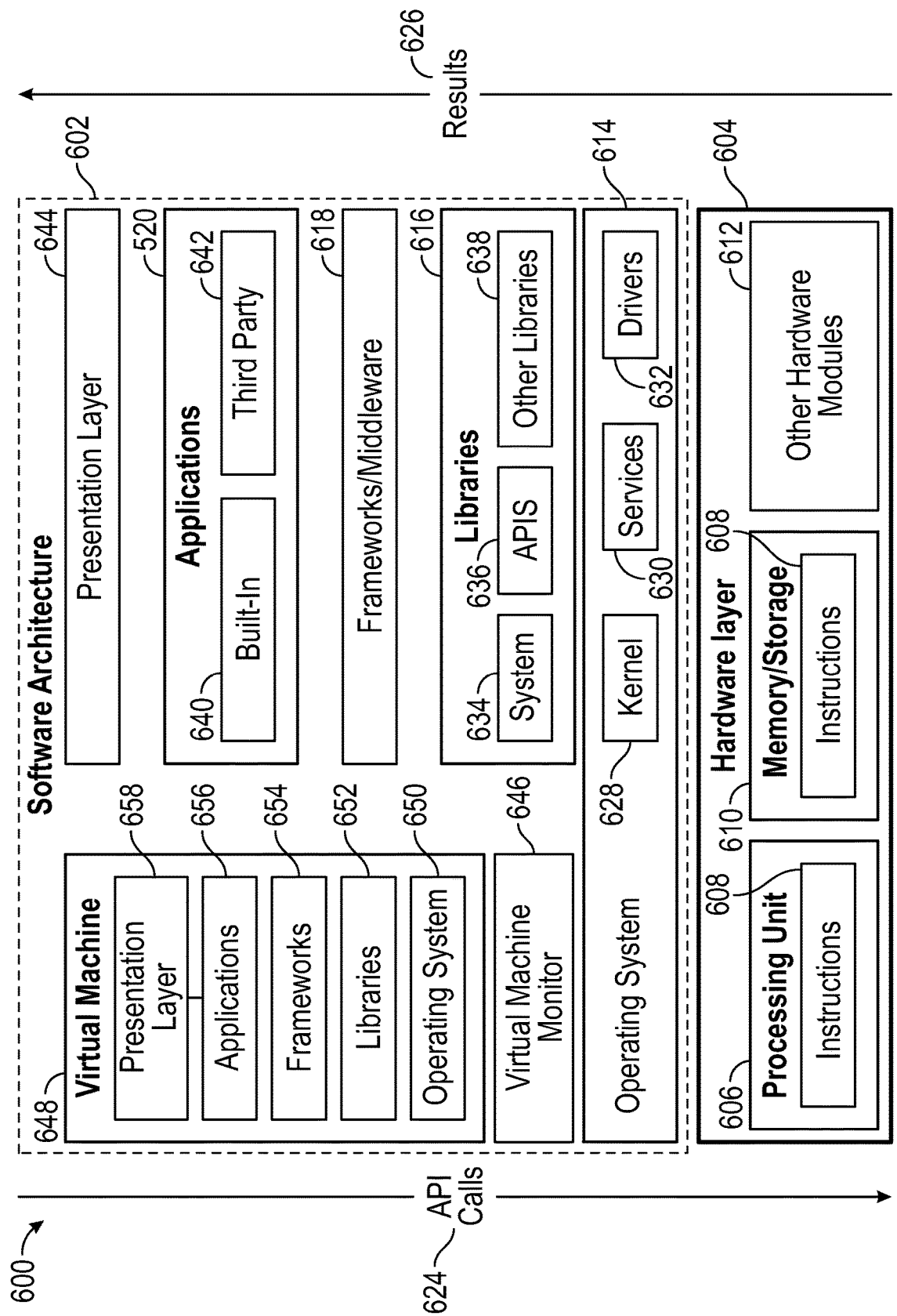
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
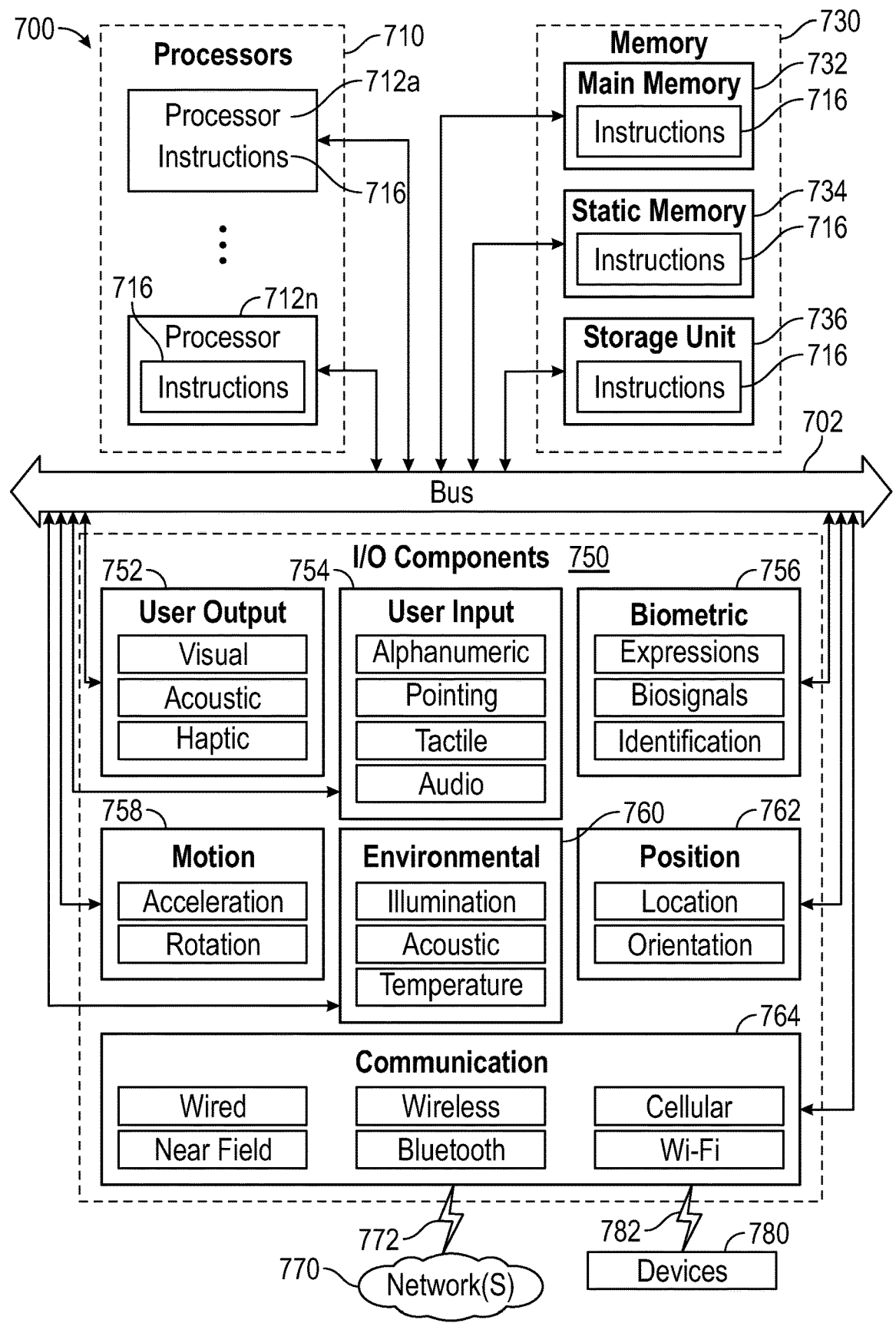
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features of the example implementations described above) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system including a processor, and a memory in communication with the processor, the memory including executable instructions that, when executed by the processor, cause the data processing system to perform functions of receiving audio data, the audio data including a speech, performing at least one of acoustic scoring and language scoring on the speech, determining a pronunciation score of one or more words of the speech based on the acoustic scoring and the language scoring, determining that the pronunciation score for the one or more words does not satisfy a threshold score, responsive to determining that the pronunciation score does satisfy the threshold score, identifying the one or more words as mispronounced, and responsive to identifying the one or more words as mispronounced, outputting the one or more words and the pronunciation score thereof.

Item 2. The data processing system of item 1, wherein performing the acoustic scoring includes extracting phonemes from one or more words of the speech; and assigning a first score to each of the one or more words based on the extracted phonemes, the first score indicating a first level of confidence that a pronunciation of the one or more words is accurate.

Item 3. The data processing system of item 1 or 2, wherein performing the language scoring includes extracting the one or more words from the speech, and assigning a second score to each of the extracted words, the second score indicating a second level of confidence that the pronunciation of the extracted word is accurate.

Item 4. The data processing system of any of the preceding items, wherein determining the pronunciation score includes combining the first score and the second score.

Item 5. The data processing system of any of the preceding items, wherein determining the pronunciation score of the one or more words includes using a decision tree.

Item 6. The data processing system of any of the preceding items, wherein using the decision tree includes using a gradient boosting tree.

Item 7. The data processing system of any of the preceding items, wherein the one or more words have a length greater than three letters, the one or more words are not functional words, and/or the one or more words are not divisive.

Item 8. The data processing system of any of the preceding items, wherein the pronunciation score is on a scale of 1 to 100, and the threshold is a score of 75.

Item 9. A method for enhancing pronunciation during a speech, the method including receiving audio data, the audio data including a speech, performing at least one of acoustic scoring and language scoring on the speech, determining a pronunciation score of one or more words of the speech based on the acoustic scoring and the language scoring, determining that the pronunciation score for the one or more words does not satisfy a threshold score, responsive to determining that the pronunciation score does satisfy the threshold score, identifying the one or more words as mispronounced, and responsive to identifying the one or more words as mispronounced, outputting the one or more words and the pronunciation score thereof.

Item 10. The method of item 9, wherein performing the acoustic scoring includes extracting phonemes from one or more words of the speech; and assigning a first score to each of the one or more words based on the extracted phonemes, the first score indicating a first level of confidence that a pronunciation of the one or more words is accurate.

Item 11. The method of item 9 or 10, wherein performing the language scoring includes extracting the one or more words from the speech, and assigning a second score to each of the extracted words, the second score indicating a second level of confidence that the pronunciation of the extracted word is accurate.

Item 12. The method of any of items 9-11, wherein determining the pronunciation score includes combining the first score and the second score.

Item 13. The method of any of items 9-12, wherein determining the pronunciation score of the one or more words includes using a decision tree.

Item 14. The method of any of items 9-13, wherein using the decision tree includes using a gradient boosting tree.

Item 15. The method of any of items 9-14, wherein the one or more words have a length greater than three letters, the one or more words are not functional words, and/or the one or more words are not divisive.

Item 16. The method of any of items 9-15, wherein the pronunciation score is on a scale of 1 to 100, and the threshold is a score of 75.

Item 17. A non-transitory computer readable medium on which are stored instructions that, when executed, cause a programmable device to enhance pronunciation of a speech by receiving audio data, the audio data including a speech, performing at least one of acoustic scoring and language scoring on the speech, determining a pronunciation score of one or more words of the speech based on the acoustic scoring and the language scoring, determining that the pronunciation score for the one or more words does not satisfy a threshold score, responsive to determining that the pronunciation score does satisfy the threshold score, identifying the one or more words as mispronounced, and responsive to identifying the one or more words as mispronounced, outputting the one or more words and the pronunciation score thereof.

Item 18. The non-transitory computer readable medium of item 17, wherein performing the acoustic scoring includes extracting phonemes from one or more words of the speech; and assigning a first score to each of the one or more words based on the extracted phonemes, the first score indicating a first level of confidence that a pronunciation of the one or more words is accurate.

Item 19. The non-transitory computer readable medium of item 17 or 18, wherein performing the language scoring includes extracting the one or more words from the speech, and assigning a second score to each of the extracted words, the second score indicating a second level of confidence that the pronunciation of the extracted word is accurate.

Item 20. The non-transitory computer readable medium of any of items 17-19, wherein determining the pronunciation score includes combining the first score and the second score.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
      training an acoustic model to analyze digitized speech to identify linguistic units of the digitized speech and to output an indication of a first level of confidence that a pronunciation of one or more words included in the digitized speech was accurate by:
         generating a transcript of a plurality of audio recordings comprising example speech,
         analyzing the transcript and the plurality of audio recordings to create statistical representations of sounds representing each word of the example speech, and
         using the statistical representations to determine whether the pronunciation of the one or more words is correct;
      training a language model to distinguish between similar sounding words and phrases in example digitized speech and to output an indication of a second level of confidence that the pronunciation of the one or more words included in the example digitized speech was accurate;
      receiving, from a client device over a network connection, audio data, including a speech;
      digitizing the speech to generate digitized speech;
      performing acoustic scoring and language scoring on the digitized speech by providing the digitized speech as an input to the acoustic model to obtain as a first output the indication of a first level of confidence that a pronunciation of one or more words included in the digitized speech was accurate, and providing the digitized speech as an input to the language model to obtain as a second output the indication of the second level of confidence that the pronunciation of the one or more words included in the digitized speech was accurate;
      determining a pronunciation score of one or more words of the speech based on the acoustic scoring and the language scoring by combining the indication of the first level of confidence and the indication of the second level of confidence;
      determining that the pronunciation score for the one or more words does not satisfy a threshold score;
      responsive to determining that the pronunciation score does not satisfy the threshold score, identifying the one or more words as mispronounced;
      responsive to identifying the one or more words as mispronounced, outputting the one or more words and the pronunciation score thereof;
      generating a visual representation of a correct pronunciation of the one or more words that were mispronounced, the visual representation comprising a syllable or phoneme sequence of the correct pronunciation of the one or more words that were mispronounced;
      generating an audio representation of the correct pronunciation of the one or more words that were mispronounced; and
      sending, over the network connection, the visual representation and the audio representation of the correct pronunciation of the one or more words that were mispronounced to the client device.

2. The data processing system of claim 1, wherein performing the acoustic scoring comprises:
   extracting phonemes from the one or more words of the speech; and
   assigning a first score to each of the one or more words based on the extracted phonemes extracted from the one or more words, the first score indicating a first level of confidence that a pronunciation of the one or more words is accurate.

3. The data processing system of claim 2, wherein performing the language scoring comprises:
   extracting the one or more words from the speech; and
   assigning a second score to each of the one or more words extracted from the speech, the second score indicating a second level of confidence that the pronunciation of the one or more words is accurate.

4. The data processing system of claim 3, wherein determining the pronunciation score comprises combining the first score and the second score.

5. The data processing system of claim 1, wherein determining the pronunciation score of the one or more words comprises using a decision tree.

6. The data processing system of claim 5, wherein using the decision tree comprises using a gradient boosting tree.

7. The data processing system of claim 1, wherein at least one of:
   the one or more words have a length greater than three letters;
   the one or more words are not functional words; and
   the one or more words are not divisive.

8. The data processing system of claim 1, wherein:
   the pronunciation score is on a scale of 1 to 100; and
   the threshold score is a score of 75.

9. A method for enhancing pronunciation during a speech, the method comprising:
   training an acoustic model to analyze digitized speech to identify linguistic units of the digitized speech and to output an indication of a first level of confidence that a pronunciation of one or more words included in the digitized speech was accurate by:
      generating a transcript of a plurality of audio recordings comprising example speech,
      analyzing the transcript and the plurality of audio recordings to create statistical representations of sounds representing each word of the example speech, and
      using the statistical representations to determine whether the pronunciation of the one or more words is correct;
   training a language model to distinguish between similar sounding words and phrases in example digitized speech and to output an indication of a second level of confidence that the pronunciation of the one or more words included in the example digitized speech was accurate;

receiving, from a client device over a network connection, audio data, including a speech;

digitizing the speech to generate digitized speech;

performing acoustic scoring and language scoring on the digitized speech by providing the digitized speech as an input to the acoustic model to obtain as a first output the indication of a first level of confidence that a pronunciation of one or more words included in the digitized speech was accurate, and providing the digitized speech as an input to the language model to obtain as a second output the indication of the second level of confidence that the pronunciation of the one or more words included in the digitized speech was accurate;

determining a pronunciation score of one or more words of the speech based on the acoustic scoring and the language scoring by combining the indication of the first level of confidence and the indication of the second level of confidence;

determining that the pronunciation score for the one or more words does not satisfy a threshold score;

responsive to determining that the pronunciation score does not satisfy the threshold score, identifying the one or more words as mispronounced;

responsive to identifying the one or more words as mispronounced, outputting the one or more words and the pronunciation score thereof;

generating a visual representation of a correct pronunciation of the one or more words that were mispronounced, the visual representation comprising a syllable or phoneme sequence of the correct pronunciation of the one or more words that were mispronounced;

generating an audio representation of the correct pronunciation of the one or more words that were mispronounced; and sending, over the network connection, the visual representation and the audio representation of the correct pronunciation of the one or more words that were mispronounced to the client device.

10. The method of claim 9, wherein performing the acoustic scoring comprises:

extracting phonemes from the one or more words; and assigning a first score to each of the one or more words based on the phonemes extracted from the one or more words, the first score indicating a first level of confidence that a pronunciation of the one or more words is accurate.

11. The method of claim 10, wherein performing the language scoring comprises:

extracting the one or more words from the speech; and assigning a second score to each of the one or more words extracted from the speech, the second score indicating a second level of confidence that the pronunciation of the one or more words is accurate.

12. The method of claim 11, wherein determining the pronunciation score comprises combining the first score and the second score.

13. The method of claim 9, wherein determining the pronunciation score of the one or more words comprises using a decision tree.

14. The method of claim 13, wherein using the decision tree comprises using a gradient boosting tree.

15. The method of claim 9, wherein at least one of:

the one or more words have a length greater than three letters;

the one or more words are not functional words; and the one or more words are not divisive.

16. The method of claim 9, wherein:

the pronunciation score is on a scale of 1 to 100; and the threshold score is a score of 75.

17. A non-transitory computer readable medium on which are stored instructions that, when executed, cause a programmable device to enhance pronunciation of a speech by:

training an acoustic model to analyze digitized speech to identify linguistic units of the digitized speech and to output an indication of a first level of confidence that a pronunciation of one or more words included in the digitized speech was accurate by:

generating a transcript of a plurality of audio recordings comprising example speech, analyzing the transcript and the plurality of audio recordings to create statistical representations of sounds representing each word of the example speech, and using the statistical representations to determine whether the pronunciation of the one or more words is correct;

training a language model to distinguish between similar sounding words and phrases in example digitized speech and to output an indication of a second level of confidence that the pronunciation of the one or more words included in the example digitized speech was accurate;

receiving, from a client device over a network connection, audio data, the audio data including a speech;

digitizing the speech to generate digitized speech;

performing acoustic scoring and language scoring on the digitized speech by providing the digitized speech as an input to the acoustic model to obtain as a first output the indication of a first level of confidence that a pronunciation of one or more words included in the digitized speech was accurate, and providing the digitized speech as an input to the language model to obtain as a second output the indication of the second level of confidence that the pronunciation of the one or more words included in the digitized speech was accurate;

determining a pronunciation score of one or more words of the speech based on the acoustic scoring and the language scoring by combining the indication of the first level of confidence and the indication of the second level of confidence;

determining that the pronunciation score for the one or more words does not satisfy a threshold score;

responsive to determining that the pronunciation score does not satisfy the threshold score, identifying the one or more words as mispronounced;

responsive to identifying the one or more words as mispronounced, outputting the one or more words and the pronunciation score thereof;

generating a visual representation of a correct pronunciation of the one or more words that were mispronounced, the visual representation comprising a syllable or phoneme sequence of the correct pronunciation of the one or more words that were mispronounced;

generating an audio representation of the correct pronunciation of the one or more words that were mispronounced; and sending, over the network connection, the visual representation and the audio representation of the correct pronunciation of the one or more words that were mispronounced to the client device.

18. The non-transitory computer readable medium of claim 17, wherein performing the acoustic scoring comprises:
- extracting phonemes from the one or more words; and
- assigning a first score to each of the one or more words based on the phonemes extracted from the one or more words, the first score indicating a first level of confidence that a pronunciation of the one or more words is accurate.

19. The non-transitory computer readable medium of claim 18, wherein performing the language scoring comprises:
- extracting the one or more words from the speech; and
- assigning a second score to each of the one or more words extracted from the speech, the second score indicating a second level of confidence that the pronunciation of the one or more words is accurate.

20. The non-transitory computer readable medium of claim 19, wherein determining the pronunciation score comprises combining the first score and the second score.

* * * * *